Dec. 11, 1928.
H. F. HERMAN
1,694,384
ELECTRICAL CONDENSER AND INDICATING MEANS
Filed April 22, 1925  2 Sheets-Sheet 1
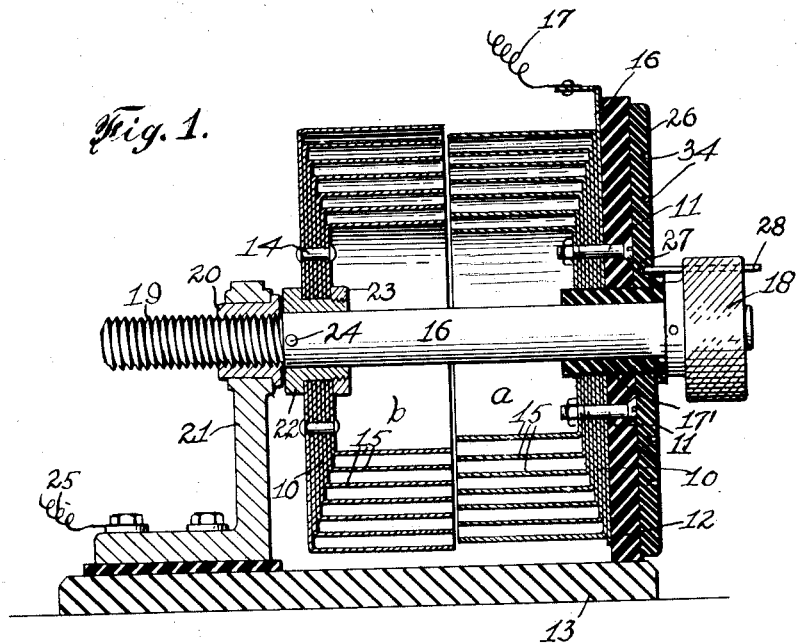
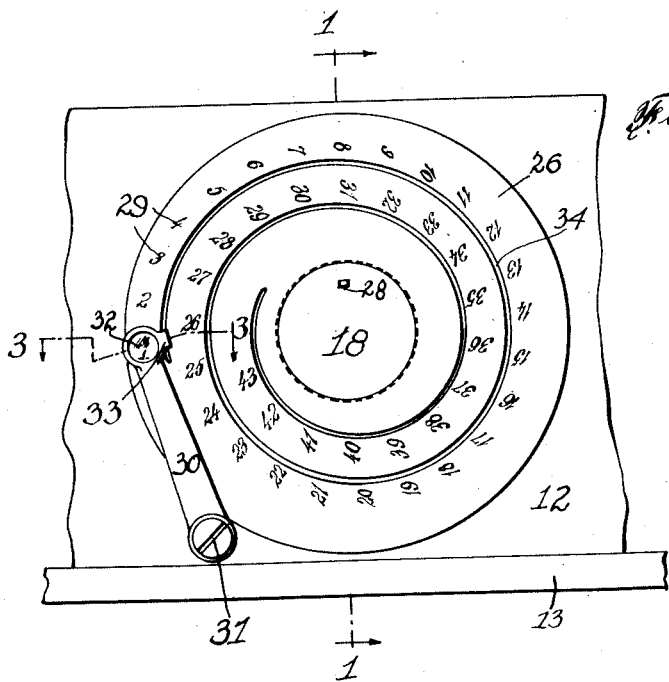
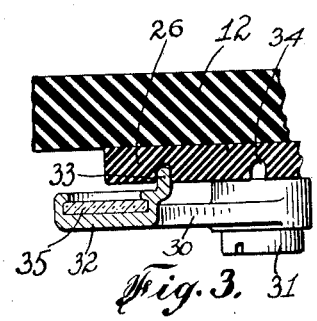
INVENTOR
H. F. Herman
BY
John O. Seifert
ATTORNEY Dec. 11, 1928. 1,694,384
H. F. HERMAN
ELECTRICAL CONDENSER AND INDICATING MEANS
Filed April 22, 1925   2 Sheets-Sheet 2
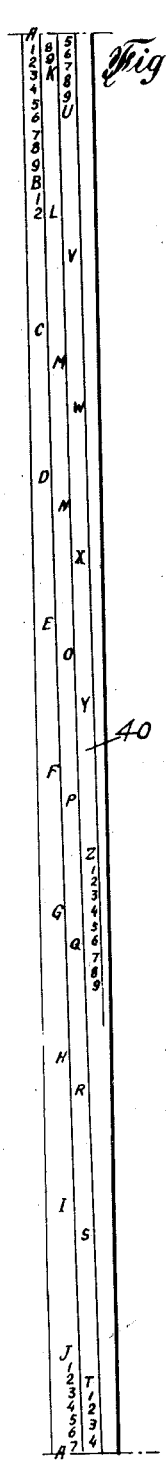
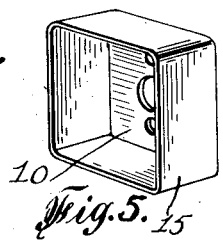
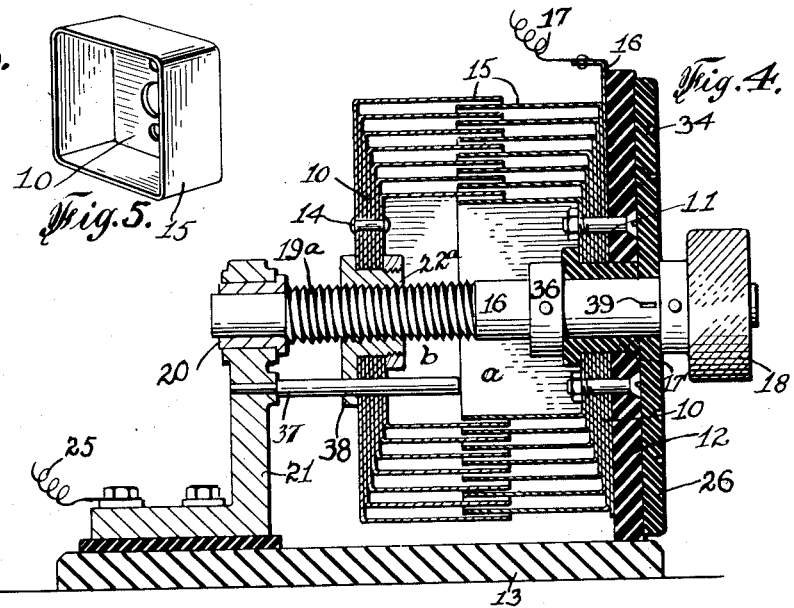
INVENTOR
H. F. Herman
BY
ATTORNEY Patented Dec. 11, 1928.

1,694,384

UNITED STATES PATENT OFFICE.

HENRY F. HERMAN, OF CHAPPAQUA, NEW YORK, ASSIGNOR TO STRAITLINE RADIO CORPORATION, OF NEW YORK, N. Y., A CORPORATION OF NEW YORK.

ELECTRICAL CONDENSER AND INDICATING MEANS.

Application filed April 22, 1925. Serial No. 25,138.

This invention relates to variable electrical condensers particularly adapted for use in connection with radio transmitting and receiving apparatus, and it is the object of the invention to provide a condenser of this character which is simple in structure, having a minimum number of parts, novel, compact and durable and highly efficient in use, and one which is readily adjustable to vary the value of the inductance capacity with accuracy.

It is a further object of the invention to combine with variable electrical condensers improved indicating means operative as the condenser is adjusted to indicate the position of the condenser parts or the value of the inductance capacity of the condenser in variable positions of adjustment.

In carrying out the invention I provide a pair of electrodes to be connected in opposite sides of the condenser circuit, each of said electrodes comprising a series of flanged plates arranged in juxtaposed and electrical connection and the flanges in spaced relation, one of the electrodes being mounted in fixed position while the other is mounted on an adjustable support axially of the fixed electrode with the plate flanges arranged in opposed relation to the spaces between the plate flanges of the fixed electrodes and adapted to participate in the adjustment of the support to interpose the plate flanges in the spaces between the plate flanges of the fixed electrode with an air space between the flanges of the respective electrodes to insulate the one electrode from the other. To indicate the position of the electrodes one relative to the other or the value of the inductance capacity of the condenser in variable positions of adjustment, there is provided a dial having indices arranged in spiral formation and an indicator to co-operate with and be positioned relative to the dial indices to indicate the adjustment of the condenser.

In the drawings accompanying and forming a part of this specification Figure 1 is a longitudinal sectional view of a condenser embodying the invention and showing one manner of adjustably mounting the same, a part of the indicating means being shown in connection therewith, and the section being taken on the line 1—1 of Figure 2 looking in the direction of the arrows.

Figure 2 is a front elevation of the indicating means.

Figure 3 is a cross sectional detail view on an enlarged scale taken on the line 3—3 of Figure 2 looking in the direction of the arrows.

Figure 4 is a view similar to Figure 1 showing a modified mounting for the condenser.

Figures 5 and 6 are perspective views on a reduced scale of modified forms of the electrode elements.

Figure 7 is an end elevation, partly broken away, of a modification of the indicator means.

Figure 8 is a front elevation of the indicator means shown in Figure 7; and

Figure 9 is a diagrammatic view to show the arrangement of the graduations or calibrations upon the indicator shown in Figures 7 and 8.

In the embodiment of the invention shown in Figure 1 there is provided a pair of electrodes $a$ and $b$, each electrode comprising a series of plates 10, in the present instance being seven in number, although a greater or less number may be employed, said plates being secured together in juxtaposed and electrical connection, the plates of electrode $a$ by bolts 11 passing therethrough and which also serve to mount the same upon a fixed support 12 of insulating material, in the present instance being representative of the front panel of a cabinet of a radio receiving apparatus mounted on a base board 13 constituting the bottom of the cabinet. The plates of electrode $b$ are secured together by rivets 14. Each of the electrode plates is arranged with a flange or flanges 15, said flanges in the arrangement shown in Figure 1 being of circular form whereby the elements of the electrodes are in the nature of cups of different diameters and one nested within the other with the adjacent flange or side wall of the cups in spaced relation to form an insulator air space between the respective walls. The electrode $a$ is connected in one side of the condenser circuit by a plate 16 in electrical connection with the outermost element of the electrode by interposing the same between the electrode and its support and having a lateral projecting portion for the connection of an electric conductor 17.

The electrode $b$ is mounted in co-axial relation to the electrode $a$, with the flanges 15 of the elements of said electrode in opposed position to the spaces between the flanges 15 of elements 10 of electrode $a$ and adapted to have axial adjustment to engage the flanges 15 of electrode $b$ to variable extent into the spaces between the flanges of electrode $a$ with the flanges in spaced relation to provide an insulating air space between the flanges of the respective electrodes and thereby vary the value of the inductance capacity of the condenser. For this purpose there is provided a shaft 16 mounted to have rotary and axial movement axially of the electrode $a$ by means of an insulator bushing 17' passing through and having a tight fit in the electrode $a$ and its support 12, said shaft having a knob 18 fixed to the end at the outer side of the support 12. The opposite end of the shaft 16 is screw threaded, as at 19, and supported at said end by threading into a conductor bushing 20 fixed in a support 21 of conductor material mounted upon and insulated from the base 13. The electrode $b$ is mounted upon a shouldered sleeve 22 and retained thereon by a nut 23 threaded onto the projecting end of said sleeve to clamp the electrode between said nut and the shoulder of the sleeve. The sleeve is of conductor material and is fixed on and in electrical connection with the shaft within the threaded portion and the support 21 as by a pin 24 whereby the electrode participates in the movement of the shaft 16. The electrode $b$ is connected in the condenser circuit opposite to the electrode $a$ by a conductor 25 connected to the support 21 and through said support and shaft 16. It will be obvious that as the shaft 16 is rotated in one direction it will be moved axially and therewith the electrode $b$ with the flanges 15 of the elements of said electrode in interposed and spaced relation to the flanges of the elements of electrode $a$, and as the shaft is rotated in reverse direction the electrodes will be moved away from each other thereby increasing and decreasing the value of the inductance capacity of the condenser.

To indicate the adjustment of the electrodes relative to each other indicating means is provided. This indicating means comprises a disk 26 having an axial opening whereby it is rotatably mounted upon the insulator bushing 17' and held against axial movement by a flange on said bushing engaging at the front of the disk, as at 27. To operatively connect the disk with the shaft to rotate therewith a pin 28 fixed in and projecting from the face of the disk slidably engages in a perforation in the knob 18. The disk is arranged on the face thereof with indices 29 arranged in spiral form extending from the peripheral portion of the disk and terminating at a point adjacent the knob 18, said indices in the present instance comprising numerals equidistantly spaced and consecutively numbered from 1 to 43. To indicate the position of the condenser electrodes an indicator or pointer is provided pivotally supported on the support or panel 12 at a point outside of the disk, as at 31, the free end having an opening 32 therein and said end adapted to be swung in a path substantially radially of the disk. To cause the indicator to move radially as the disk is rotated to position the opening in the indicator relative to the dial indices the indicator adjacent the opening is provided with a laterally extending lip 33 for slidable engagement in a spirally formed groove 34 arranged within and in juxtaposed relation to the indices. The opening 32 may be provided with a magnifying glass 35 so that the dial indices may be more readily observed.

In Figures 5 and 6 I have shown modified arrangements of the elements 10 of the electrodes $a$ and $b$. The arrangement shown in Figure 4 is similar to that disclosed in Figure 1 with the exception that the element is of rectangular shape instead of circular. In the arrangement shown in Figure 6 the plate has the opposite end portions only bent up or flanged at right angles to the intermediate portion. In both of these arrangements the plate is arranged with the central opening for the passage of the mounting shaft 16 for the one electrode and the engagement of the securing means 11 and 14. It will be obvious that in the arrangement of the electrode elements shown in Figures 5 and 6 that said elements of electrode $b$ cannot be rotated with the shaft 16 relative to the elements of the fixed electrode $a$. For this purpose the shaft is mounted to have rotative movement only, the shaft being held against axial movement by the knob abutting against the dial 26 and a collar 36 pinned to the shaft at the end of the insulator bushing 17' opposite to the dial. The shaft is arranged with a threaded portion $19^a$ intermediate the ends and the end of the shaft opposite to the knob is journaled in the bushing 20 in the support 21 instead of having threaded connection with said bushing. The condenser electrode $b$ is adapted to have movement imparted thereto toward and away from the condenser electrode $a$ as the shaft 16 is rotated by substituting an internally threaded bushing $22^a$ for the bushing 22 shown in Figure 1 and having connection with the threaded portion of the shaft, the threaded sleeve or bushing with the electrode being held against rotation with the shaft by a pin 37 fixed in and projecting from the support 21 and slidably engaging in a perforation in an ear of the bushing 22, as shown at 38, and registering perforations in the electrode elements 10. It will be obvious that as the shaft 16 is rotated the electrode $b$ will be moved toward or away from the electrode $a$ in accordance with the direction of rotation of the shaft without imparting rotative movement to said electrode. To indicate the adjustment of the condenser the dial 26 is also provided and the indicator 30 to co-operate therewith, the dial being keyed to the shaft, as at 39, to rotate therewith.

In Figures 7 and 8 there is shown a modified arrangement of the indicator means. In this arrangement the dial is in the form of a disk 40 which is fixed to the condenser shaft 16 and is also arranged with means to serve to rotate said shaft and to facilitate said rotation the disk is provided with a circumferentially knurled or serrated bead 41. The calibrations instead of being upon the face of the disk are arranged upon the periphery of the disk in spiral formation, such calibrations comprising the characters of the alphabet in equidistant spaced relation with the figure indices 1 to 9, inclusive, in the spaces between adjacent characters, this calibration being shown in a diagrammatic manner in Figure 9. The disk is also provided with a spirally formed groove arranged in juxtaposed relation to the calibrations for the engagement of a lip 43 extending laterally from one end of an indicator 44 adjacent the opening therein through which to observe the calibrations, similar to the indicator 30. The indicator is pivotally mounted on a fixed support, as at 45. To adapt this form of indicating means to a duplex arrangement of condenser a second dial 40ª is provided rotatably supported in concentric relation to the dial 40, said dial 40ª being arranged with the calibrations and groove similar to the dial 40 with which an indicator 44ª co-operates similar to the indicator 44 with the dial 40.

Having thus described my invention I claim:

1. In an electric condenser, a pair of electrodes, each electrode including a series of flanged plates arranged in nested relation with the connecting portions in electrical connection and the flanges in spaced relation, a fixed dielectric support upon which one electrode is mounted with the plates in juxtaposed relation thereto, a shaft supported axially in the fixed electrode and support therefor to have rotary and axial movement therein and upon which the other electrode is mounted co-axially of the fixed electrode with the flanges thereof in opposed relation to the spaces between the flanges of said fixed electrode, and said second electrode being adapted to participate in the axial movement of the shaft to interengage the flanges thereof in the spaces between the plate flanges of the fixed electrode to increase and decrease the value of the inductance capacity of the condenser.

2. In an electric condenser, a pair of electrodes, each electrode including a series of flanged plates arranged in nested relation with the connecting portions in electrical connection and the flanges in spaced relation, a fixed dielectric support upon which the one electrode is mounted with the plates in juxtaposed relation thereto, means for electrically connecting said electrode in one side of the condenser circuit, a shaft mounted at one end in the support for and axially of and insulated from the fixed electrode, and at the other end having screw threaded connection with a fixed support, to have rotary and axial movement and upon which the other electrode is mounted coaxially of the fixed electrode with the flanges in opposed relation to the spaces between the flanges of the fixed electrode, and adapted to participate in the axial movement of the shaft to interengage the flanges thereof with the plate flanges of the fixed electrode to vary the value of the inductance capacity of the condenser, and means to connect said latter electrode in the side of the condenser circuit opposite to the fixed electrode through said shaft.

3. In an electric condenser, a pair of electrodes, each electrode including a series of flanged plates arranged in nested relation with the connecting portions in electrical connection and the flanges in spaced relation, a fixed dielectric support upon which one electrode is mounted with the plates in juxtaposed relation thereto and the flanges extending laterally thereof, a shaft mounted at one end in the support of the fixed electrode axially thereof and insulated therefrom to have rotary and axial movement, said shaft having a knob fixed to said end and arranged with a screw thread at the opposite end, a fixed support with which the threaded end of the shaft has connection, means to mount the other electrode on said shaft to participate in the rotary and axial movement thereof with the flanges of said electrode arranged in opposed relation to the spaces between the flanges of the fixed electrode whereby the flanges of the plates of the electrode on the shaft by the rotary movement of the latter are moved into and out of the spaces between the plate flanges of the fixed electrode to vary the value of the inductance capacity of the condenser.

4. In an electric condenser, a pair of electrodes, each electrode including a series of flanged plates arranged in nested relation with the connecting portions in electrical connection and the flanges in spaced relation, a fixed dielectric support upon which one electrode is fixed with the plates in juxtaposed relation thereto and the flanges extending laterally thereof, a shaft journaled adjacent one end in the support for the fixed electrode axially of and insulated from said electrode, said shaft being arranged with a threaded portion, a knob arranged on the end of the shaft projecting through said support to rotate the same, a fixed support with which the threaded portion of the shaft has connection and means to mount the other electrode upon the threaded portion of the shaft with the flanges thereof arranged in opposed relation to the spaces between the flanges of the fixed electrode, and said electrode on the shaft through the rotation of the shaft being adapted to be adjusted on the shaft to move the plate flanges of said electrode into and out of the spaces between the flanges of the plates of the fixed electrode to vary the value of the inductance capacity of the condenser.

5. In an electric condenser, a pair of electrodes, one of which electrodes is fixed, a rotatable and axially adjustable support for the other electrode operative by the rotation thereof to adjust the same axially and therewith the electrode carried thereby relative to the fixed electrode, a disk rotatable with the support for the one electrode, without participating in the axial movement thereof, said disk being arranged with indices in spiral formation and a groove spirally formed in relation to the indices, and a hand pivotally supported independent of the disk and having a part to engage in the disk groove and positioned thereby relative to the indices to indicate the adjustment of the condenser.

6. In an electric condenser, a pair of electrodes, one of which electrodes is fixed, a rotatable and axially adjustable support for the other electrode operative by the rotation thereof to adjust the same axially and therewith the electrode carried thereby relative to the fixed electrode, a disk rotatable with the support for the one electrode without participating in the axial movement thereof, said disk having indices on one face thereof arranged in spiral form, a groove spirally formed in relation to the indices, a hand pivotally supported at one end independent of the disk and having an opening at the opposite end and a lip adjacent to said opening to engage the spiral groove of the disk to position said hand with the opening relative to the indices to observe the latter therethrough.

Signed at New York city, in the county of New York and State of New York this 27th day of March, 1925.

HENRY F. HERMAN.